United States Patent [19]

Strycker

[11] 3,714,160
[45] Jan. 30, 1973

[54] PHENOXAPHOSPHINIC ACID DERIVATIVES

[75] Inventor: Stanley J. Strycker, Midland, Mich.
[73] Assignee: The Dow Chemical Company, Midland, Mich.
[22] Filed: May 25, 1970
[21] Appl. No.: 48,693

Related U.S. Application Data

[62] Division of Ser. No. 764,913, Oct. 3, 1968, Pat. No. 3,576,863.

[52] U.S. Cl..........260/247.7 C, 424/248, 260/551 P, 260/936
[51] Int. Cl. .............................................C07d 87/32
[58] Field of Search.............................260/247.7 C

[56] References Cited

UNITED STATES PATENTS 2,865,948  12/1958  Fusco...............................260/936

OTHER PUBLICATIONS

Campbell J. Chem. Soc. C, 1968, pages 3026–3028, precise date unknown.
Granoth et al., Israel J. of Chemistry Vol. 6 (1968), Sept.–Oct. pages 651–657.

Primary Examiner—Alex Mazel
Assistant Examiner—Jose Tovar
Attorney—Griswold & Burdick, Theodore Post and John L. Spalding

[57] ABSTRACT

Phenoxaphosphinic acid derivatives corresponding to the formula

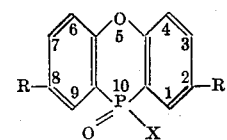

wherein R represents chloro, bromo, lower alkyl or lower alkoxy and X represents morpholino. The compounds are useful as pesticides for the control of plant pests.

2 Claims, No Drawings

PHENOXAPHOSPHINIC ACID DERIVATIVES

This application is a division of U. S. patent application Ser. No. 764,913, filed 10/3/68 now U. S. Pat. No. 3,576,863.

SUMMARY OF THE INVENTION

The present invention concerns a group of new phenoxaphosphinic acid derivatives corresponding to the formula

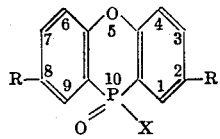

In this and succeeding formulas, R represents chloro, bromo, lower alkyl or lower alkoxy and X represents morpholino

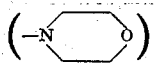

. In this present specification and claims lower alkyl and lower alkoxy represent moieties containing from one, to two, to three, to four carbon atoms, such as methyl, ethyl, propyl, butyl, methoxy, ethoxy, propoxy and butoxy. The new compounds are high melting solids. They have low solubilities in water and a somewhat higher solubility in common organic solvents such as acetone, chloroform and benzene. The new compounds are useful as pesticides for the control of plants including bacteria and fungi.

2,8-di-n-butoxy-10-(allylamino)phenoxaphosphine 10-oxide, 2,8-di-n-butyl-10-morpholinophenoxaphosphine 10-oxide, 2,8-di-n-propoxy-10-morpholinophenoxaphosphine 10-oxide, 2,8-di-n-butyl-10-(phenylthio)phenoxaphosphine 10-oxide, 2,8-diethoxy-10-(phenylthio)phenoxaphosphine 10-oxide and 2,8-di-n-butoxy-10-(phenylthio)phenoxaphosphine 10-oxide.

The new phenoxaphosphinic acid derivatives are prepared by reacting a 2,8-disubstituted phenoxa-phosphinyl chloride with HX when HX is morpholine according to the following mechanism:

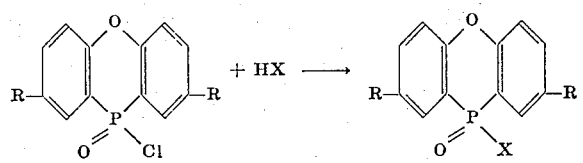

The reaction is conveniently carried out in an inert organic solvent as reaction medium, such as benzene, toluene, xylene, methylene chloride, tetrahydrofuran, ether, dioxane, 1,2-dimethoxyethane or mixtures thereof. The amounts of the reagents to be employed are not critical, some of the desired product being obtained when employing any proportions of the reactants. However, the reaction consumes the reactants in equimolar proportions and such proportions are generally preferred. The reaction proceeds at a hydrogen chloride or chloride liberating temperature, conveniently at temperatures between 50° and 150°C. and preferably at the boiling temperature. A hydrogen chloride acceptor such as triethylamine, pyridine, potassium carbonate or N,N-dimethylaniline is added to the reaction medium if desired, and is preferable when HX is allylamine or morpholine.

In preparing the compounds of this invention morpholine, the reactants and reaction medium are contacted in any convenient order. Following the contacting of the reactants, the temperature of the reaction mixture is maintained within the reaction temperature range for a short period of time. After the reaction period, the desired product can be separated and collected by conventional procedures such as crystallization and decantation or filtration. The new phenoxaphosphinic acid derivatives thus isolated can be employed in pesticidal applications or further purified by conventional procedures such as washing and crystallization before being so employed.

DESCRIPTION OF THE PREFERRED EMBODIMENTS

The following examples describe completely representative specific embodiments and the best modes contemplated by the inventor for carrying out the invention.

EXAMPLE 1 10-ALLYLAMINO-2,8-DIMETHYLPHENOXAPHOSPHINE 10-OXIDE

To a stirred partial solution of 5.58 g. (0.02 mole) of 2,8-dimethylphenoxaphosphinyl chloride in 75 ml. of 1,2-dimethoxyethane was added rapidly a solution of 1.14 g. (0.02 mole) of allylamine and 2.29 (0.022 mole) of triethylamine in 40 ml. of 1,2-dimethoxyethane. The addition was carried out at room temperature and was complete in 10 minutes. The resulting mixture, containing a white precipitate, was then warmed slightly and filtered. The residual salt was washed well with several portions of warm 1,2-dimethoxyethane. The residue on evaporation of the 1,2-dimethoxyethane liquors was recrystallized from 100 ml. of the same solvent to give the title compound as nearly colorless crystals, melting at 135°–138°C. A sample recrystallized once again melting at 136°–139 °C.

The procedure is repeated with the substitution of morpholine in place of allylamino to give the corresponding 10-morpholino derivative.

2,8-DIMETHOXY-10-PHENYLTHIOPHENOXAPHOSPHINE 10-OXIDE

A stirred partial solution of 3.11 (0.01 mole) of 2,8-dimethoxyphenoxaphosphinyl chloride in 50 ml. of toluene was treated with 1.10 g. (0.01 mole) of thiophenol in 50 ml. of toluene at room temperature. Subsequently, the reaction mixture was heated at reflux for a period of one hour, filtered hot and allowed to cool to room temperature. The product separated as colorless Crystalline $C_{20}H_{17}O_4PS$, having a molecular weight of 384.38.

EXAMPLE 2 2,8-DICHLORO-10-MORPHOLINOPHENOXAPHOSPHINE 10-OXIDE

To a stirred partial solution of 6.38 g. (0.02 mole) of 2,8-dichlorophenoxaphosphinyl chloride in 100 ml. of 1,2-dimethoxyethane was added a solution of 1.91 g. (0.022 mole) of morpholine and 2.2 g. (0.022 mole) pf triethylamine in 50 ml. of 1,2-dimethoxyethane. The addition was carried out at room temperature followed by a 2-hour period of heating at 60°–70°C. The reaction mixture was filtered warm to remove the triethylamine hydrochloride which had separated. Evaporation of the solvent gave the product as colorless crystals which were subsequently purified by recrystallization from cyclohexane to give product $C_{16}H_{14}Cl_2NO_3P$, having a molecular weight of 370.17.

A substitution of 2,8-dibromophenoxaphosphinyl chloride for the 2,8-dichloro reagent gives the corresponding 2,8-dibromo compound.

The following compounds of the present invention are prepared following procedures described above.

2,8-dimethyl-10-morpholinophenoxaphosphine 10-oxide (melting at 165°–168°C.) by reacting together 2,8-dimethylphenoxaphosphinyl chloride and morpholine.

2,8-di-n-propyl-10-morpholinophenoxaphosphine 10-oxide (molecular weight 385.43) by reacting together 2,8-di-n-propylphenoxaphosphinyl chloride and morpholine.

2,8-diethoxy-10-morpholinophenoxaphosphine 10-oxide (molecular weight 389.38) by reacting together 2,8-diethoxyphenoxaphosphinyl chloride and morpholine.

2,8-dibromo-10-morpholinophenoxaphosphine 10-oxide (molecular weight 459.10) by reacting together 2,8dibromophenoxaphosphinyl chloride and morpholine.

The compounds of the present invention or compositions containing the same are useful as pesticides. For the control of insect and plant pests including bacteria and fungi, the compounds or compositions containing them can be applied to pests and their habitats in pesticidal amounts to obtain adequate controls and kills. Such pests can be controlled as the two-spotted spider mite, American cockroach, alfalfa, lettuce downy mildew, tomato late blight, acid fast bacterium, fungus rhizoctonia solani, Trichophyton mentagrophytes, Staphylococcus aureus and Bacillus subtilis. This is not to imply that all of the compounds herein are equally effective against the same organisms or at the same concentrations.

The compounds conveniently can be employed in liquid or dust compositions. In such usage, the compounds are modified with one or a plurality of adjuvants or helpers including water, organic solvents, petroleum oils, petroleum distillates, naphthas, or other liquid carriers, surface active dispersing agents and finely divided solids such as chalk, talc or bentonite. Depending upon the concentration of the toxicant compounds in such formulations, the augmented compositions are adapted to be distributed on plants or plant parts, or in soil, inks, adhesives, cutting oils, paints, textiles, paper, lumber, white or cooling waters, or to be employed as concentrates and subsequently diluted with additional liquid or solid adjuvants to produce the ultimate treating compositions. The toxicant compounds of the present invention and the compositions containing these compounds are introduced into the various environments by such conventional techniques as spraying, dusting, drenching, and plowing into the soil.

The exact concentration of the novel compounds to be employed in the treating compositions is not critical and may vary considerably provided the required amount of effective agent is supplied on the plant or plant part, in the soil, ink, adhesive, cutting oil, textile, paper, wood and so forth. The concentration of toxicant in liquid compositions generally is from about 0.05 to 50 percent by weight. Concentration up to 95 percent by weight oftentimes are conveniently employed. In dusts, the concentration of the toxicant can be from about 0.05 to 10 percent by weight. In compositions to be employed as concentrates, the toxicant can be present in a concentration of from 5 to 98 percent by weight.

In operations against soil dwelling pests such as soil fungi and bacteria, the compounds of the present invention are effective in the killing of such organisms at concentrations of 500 parts per million be weight of soil. When employed as the active constituent against bacterial and fungal diseases of plants, the compounds are effective at concentrations of 1,500 parts per million by weight. In other operations, the compounds of the present invention are effective in preventing the microbial degradation of wood when the wood is impregnated with liquid compositions containing the toxic compounds of this invention at concentrations of 10,000 parts per million by weight. In addition, the compounds of the present invention are useful for the control of terrestrial plants when employed at application rates of 100 pounds per acre. In still further operations, the compounds of the present invention are employed in paints, cutting oils white or cooling waters, casein suspensions or adhesives at a concentration of at least 1,500 parts per million by weight to achieve kill and control of fungi and bacteria which cause microbiological degradation of these products.

In representative operations, and 2,8-dimethyl-10-morpholinophenoxaphosphine 10-oxide give complete control of alfalfa, lettuce downy mildew and tomato late blight when the compound is employed in aqueous compositions at a concentration of 50 pounds per acre in the first instance as a pre-emergent herbicide and at a concentration of 2,000 parts per million in the second instance, as a foliar fungicide.

In further operations, and 2,8-dimethyl10-morpholinophenoxaphosphine 10-oxide give complete control of acid fast bacterium and fungus rhizoctonia solani when the compound is employed in aqueous compositions at a concentration of 500 parts per million both as bactericide and as fungicide.

The 2,8-disubstituted phenoxaphosphinyl chlorides required as starting materials for these reactions are prepared by reacting one of the corresponding 2,8-disubstituted phenoxaphosphinic acids with thionyl chloride wherein a chloro group replaces the acidic hydroxyl group in a conventional manner. The procedure for the synthesis of the phosphinic acids is based on that described by L. D. Freedman, G. O. Doak and J. R. Edmisten, J. Org. Chem. 26, 284

(1961) for the preparation of 2,8-dimethylphenoxaphosphinic acid, in which di-p-tolyl ether is reacted with phosphorus trichloride in the presence of aluminum chloride and the reaction mixture is hydrolyzed. In place of di-p-tolyl ether, the corresponding di-p-(lower alkyl)phenyl ether, the di-p-halophenyl ether or the di-p-(lower alkoxy)phenyl ether is substituted to give the other 2,8-(disubstituted)phenoxaphosphinic acids which are in turn reacted with thionyl chloride to give the phenoxaphosphinyl chloride starting materials.

What is claimed is:

1. A phenoxaphosphinic acid derivative corresponding to the formula

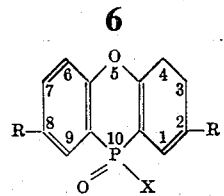

wherein R represents chloro, bromo, lower alkyl or lower alkoxy and X represents morpholino.

2. The compound of claim 1 wherein R represents methyl and X represents morpholino.

* * * * *